United States Patent
Sugiura (10) Patent No.: US 9,323,382 B2
(45) Date of Patent: Apr. 26, 2016

(54) INFORMATION TERMINAL DEVICE AND TOUCH COORDINATE DETERMINATION METHOD

(71) Applicant: FUJITSU LIMITED, Kawasaki-shi, Kanagawa (JP)

(72) Inventor: Yohei Sugiura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 286 days.

(21) Appl. No.: 13/936,776

(22) Filed: Jul. 8, 2013

(65) Prior Publication Data

US 2014/0071084 A1   Mar. 13, 2014

(30) Foreign Application Priority Data

Sep. 12, 2012   (JP) ................... 2012-200766

(51) Int. Cl.
*G06F 3/041* (2006.01)
*G06F 3/044* (2006.01)
*G06F 3/045* (2006.01)

(52) U.S. Cl.
CPC .............. *G06F 3/0416* (2013.01); *G06F 3/044* (2013.01); *G06F 3/045* (2013.01); *G06F 2203/04106* (2013.01)

(58) Field of Classification Search
CPC ............................................ G06F 2203/04106
USPC .................................................. 345/156–184
See application file for complete search history.

(56) References Cited

U.S. PATENT DOCUMENTS

| 2008/0303797 | A1* | 12/2008 | Grothe .......................... 345/173 |
| 2011/0181523 | A1* | 7/2011  | Grothe et al. ................. 345/173 |
| 2012/0218221 | A1  | 8/2012  | Igeta |
| 2012/0256880 | A1* | 10/2012 | Han et al. ...................... 345/175 |

FOREIGN PATENT DOCUMENTS

| JP | 07-334308 | 12/1995 |
| JP | 07334308 A | * 12/1995 |
| WO | WO 2006/133018 | 12/2006 |

OTHER PUBLICATIONS

CNOA—Office Action mailed on Jan. 12, 2016 for corresponding Chinese Application No. 201310325202.9, with English translation of the relevant part.
JPOA—Japanese Office Action mailed on Mar. 8, 2016 for corresponding Japanese Application No. 2012-200766, with English translation of the relevant part.

* cited by examiner

*Primary Examiner* — Carolyn R Edwards
(74) *Attorney, Agent, or Firm* — Fujitsu Patent Center (57) ABSTRACT

A mobile terminal device includes an electrostatic touch panel, a resistive touch panel, a memory, and a processor connected to the memory. The processor acquires a touch coordinate detected on at least one of the electrostatic touch panel and the resistive touch panel and determines a touch mode including the presence or absence of strong touch at equal to or higher than a predetermined pressure based on the acquired touch coordinate. Then, the processor specifies a touch coordinate at which the strong touch is made when a touch mode with the strong touch is determined and the touch coordinate is detected on each of the electrostatic touch panel and the resistive touch panel.

10 Claims, 8 Drawing Sheets

| ELECTRO-STATIC SYSTEM/ NUMBER OF COORDI- NATES | ELECTRO-STATIC SYSTEM/ DETECTION AREA | RESIST-ANCE FILM SYSTEM/ NUMBER OF COORDI- NATES | DISTANCE BETWEEN COORDI-NATES OF BOTH SYSTEMS | OVERLAP OF DETECTION RANGES | TOUCH MODE | USE COORDINATES |
|---|---|---|---|---|---|---|
| 0 | | 1 | | | STRONG TOUCH WITH INSULATOR | RESISTANCE FILM SYSTEM |
| EQUAL TO OR MORE THAN ONE | EQUAL TO OR LARGER THAN S | | | | IN WATER OR WATER FILM ON PANEL | RESISTANCE FILM SYSTEM |
| EQUAL TO OR MORE THAN ONE | SMALLER THAN S | 0 | | | SOFT TOUCH WITH CONDUCTOR | ELECTROSTATIC CAPACITANCE SYSTEM |
| EQUAL TO OR MORE THAN ONE | SMALLER THAN S | 1 | SMALLER THAN r | | STRONG TOUCH WITH CONDUCTOR AT ONE PLACE | ELECTROSTATIC CAPACITANCE SYSTEM* |
| EQUAL TO OR MORE THAN ONE | SMALLER THAN S | 1 | EQUAL TO OR LARGER THAN r | YES | STRONG TOUCH WITH CONDUCTOR AT PLURALITY OF PLACES | ELECTROSTATIC CAPACITANCE SYSTEM* |
| EQUAL TO OR MORE THAN ONE | SMALLER THAN S | 1 | EQUAL TO OR LARGER THAN r | NO | STRONG TOUCH WITH INSULATOR WHILE HAND IS PLACED | CORRECT COORDINATES OF RESISTANCE FILM SYSTEM |

*: SPECIFY COORDINATES OF STRONG TOUCH BY USING COORDINATES OF RESISTANCE FILM SYSTEM

| ELECTRO-STATIC SYSTEM/ NUMBER OF COORDI-NATES | ELECTRO-STATIC SYSTEM/ DETECTION AREA | RESIST-ANCE FILM SYSTEM/ NUMBER OF COORDI-NATES | DISTANCE BETWEEN COORDI-NATES OF BOTH SYSTEMS | OVERLAP OF DETECTION RANGES | TOUCH MODE | USE COORDINATES |
|---|---|---|---|---|---|---|
| 0 | | 1 | | | STRONG TOUCH WITH INSULATOR | RESISTANCE FILM SYSTEM |
| EQUAL TO OR MORE THAN ONE | EQUAL TO OR LARGER THAN S | | | | IN WATER OR WATER FILM ON PANEL | RESISTANCE FILM SYSTEM |
| EQUAL TO OR MORE THAN ONE | SMALLER THAN S | 0 | | | SOFT TOUCH WITH CONDUCTOR | ELECTROSTATIC CAPACITANCE SYSTEM |
| EQUAL TO OR MORE THAN ONE | SMALLER THAN S | 1 | SMALLER THAN r | | STRONG TOUCH WITH CONDUCTOR AT ONE PLACE | ELECTROSTATIC CAPACITANCE SYSTEM * |
| EQUAL TO OR MORE THAN ONE | SMALLER THAN S | 1 | EQUAL TO OR LARGER THAN r | YES | STRONG TOUCH WITH CONDUCTOR AT PLURALITY OF PLACES | ELECTROSTATIC CAPACITANCE SYSTEM * |
| EQUAL TO OR MORE THAN ONE | SMALLER THAN S | 1 | EQUAL TO OR LARGER THAN r | NO | STRONG TOUCH WITH INSULATOR WHILE HAND IS PLACED | CORRECT COORDINATES OF RESISTANCE FILM SYSTEM |

*: SPECIFY COORDINATES OF STRONG TOUCH BY USING COORDINATES OF RESISTANCE FILM SYSTEM

INFORMATION TERMINAL DEVICE AND TOUCH COORDINATE DETERMINATION METHOD

CROSS-REFERENCE TO RELATED APPLICATION

This application is based upon and claims the benefit of priority of the prior Japanese Patent Application No. 2012-200766, filed on Sep. 12, 2012, the entire contents of which are incorporated herein by reference.

FIELD

The embodiments discussed herein are directed to an information terminal device and a touch coordinate determination method.

BACKGROUND

In recent years, touch panels have been incorporated in many information terminal devices such as mobile phones. An information terminal device incorporating a touch panel detects touch by a user on a screen displaying information so as to receive an operation input. This enables the user to operate the device instinctively, which improves convenience of the information terminal device.

The touch panels detect touch with various systems. Recently, electrostatic capacitive touch panels (hereinafter, referred to as "electrostatic touch panels") that detect a change in an electrostatic capacitance by touch have become mainstream and have been incorporated in many information terminal devices. An electrostatic touch panel can detect what is called multi touch, that is, touch on a plurality of positions at the same time. Note that because the electrostatic touch panel detects a change in the electrostatic capacitance, the electrostatic touch panel can detect touch with a conductor such as a user's finger but has difficulty in detecting touch with an insulator.

For example, some types of automated teller machines (ATMs) of banks employ a resistance film touch panel (hereinafter, referred to as "resistive touch panel") using two film electrodes opposed to each other with a space interposed therebetween. If two film electrodes (hereinafter, referred to as "resistance films") make contact with each other with a pressure generated by touch and an electric current flows in between the resistance films, the resistive touch panel obtains a resistance from the current so as to specify touched coordinates. That is to say, the resistive touch panel can detect touch coordinates if the resistive touch panel is touched with pressure equal to or higher than a certain pressure level regardless of whether the touching subject is a conductor or an insulator. Note that because the resistive touch panel detects the touch coordinates from the resistance, the resistive touch panel has difficulty in detecting a plurality of sets of touch coordinates when the multi touch has been made.

The respective touch detection systems have advantages and disadvantages as described above, and a combined use of touch panels employing a plurality of systems has been also considered. For example, the above-mentioned electrostatic touch panel and resistive touch panel can be superimposed on each other so as to detect touch with a conductor by the electrostatic touch panel and detect touch with an insulator by the resistive touch panel. An example of related art is described in Japanese Laid-open Patent Publication No. 07-334308.

In many information terminal devices, it is desired that more complicated and advanced operations can be performed by the touch panel with impressive progress of software and hardware in recent years. To be more specific, in tablet information terminal devices, for example, if keys equivalent to the keyboard of a personal computer and the like are made to be displayed on the touch panel so as to enable a user to perform operations of what is called touch typing and the like, operability of character input and the like is improved. In order to make it possible to perform the operations, the information terminal device performs processing of determining a key that has been pressed strongly with any one of a plurality of the user's fingers placed on the touch panel.

Furthermore, multiple touch detection processing is usable in some cases. As the multiple touch detection processing, the touch with a user's finger is detected at the time of key input and the touch with a pen is detected at the time of handwriting input of characters and the like, for example. Furthermore, when the touch with the pen is detected, it is preferable that the touch with the pen and the touch with a user's hand holding the pen are distinguished in consideration of the state where the user's hand holding the pen is placed on the touch panel. In this manner, when the touch panel is used, the touch panel may be touched in various modes depending on the situations. For this reason, in order to enable a user to perform complicated and advanced operations by the touch panel, the touch modes are required to be determined accurately.

There is no example where the technique of determining the possible touch modes when touch panels of a plurality of systems are used in combination is examined comprehensively. It is difficult to determine various touch modes depending on the situations accurately. For this reason, even if touch panels of a plurality of systems are combined, intention of the user for the touch is not reflected to the processing accurately. This arises a problem that there is certain limitation on improvement of convenience of the information terminal device.

SUMMARY

According to an aspect of an embodiment, an information terminal device includes a first touch panel that is configured to detect a touch coordinate with an electrostatic capacitance system, a second touch panel that is provided so as to be superimposed on the first touch panel and is configured to detect a touch coordinate with a resistance film system, a memory, and a processor connected to the memory. The processor executes a process including acquiring a touch coordinate detected on at least one of the first touch panel and the second touch panel, determining a touch mode including presence or absence of strong touch at equal to or higher than a predetermined pressure based on the acquired touch coordinate, and specifying a touch coordinate at which the strong touch is made when a touch mode with the strong touch is determined and the touch coordinate is detected on each of the first touch panel and the second touch panel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. In the embodiment, explained is a mobile terminal device such as a mobile phone as an example of the information terminal device but the invention is not limited by the embodiment.

Figure 1:
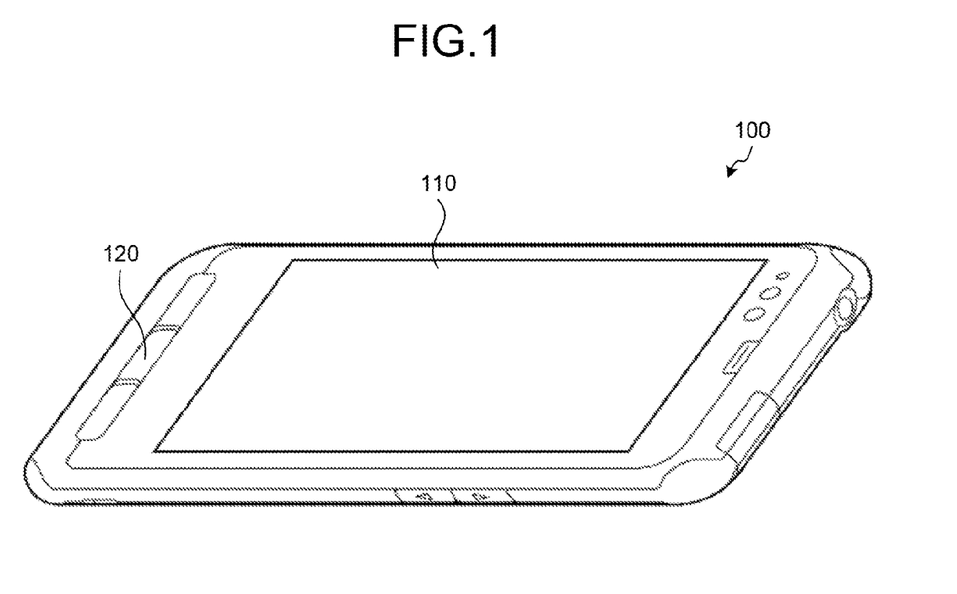
FIG. 1 is a view illustrating the outer appearance of a mobile terminal device according to an embodiment.

FIG. 1 is a view illustrating the outer appearance of a mobile terminal device 100 according to the embodiment. The mobile terminal device 100 as illustrated in FIG. 1 has an electrostatic touch panel 110 and an operation key 120.

The electrostatic touch panel 110 is provided on the surface of the mobile terminal device 100. The electrostatic touch panel 110 detects that a user's finger makes contact with it and receives an operation input with the contact. That is to say, if the electrostatic touch panel 110 is touched with a finger or the like as a conductor, the electrostatic touch panel 110 detects a change in an electrostatic capacitance with the touch and specifies touched coordinates (hereinafter, referred to as "touch coordinates"). The electrostatic touch panel 110 specifies the touch coordinates based on the change in the electrostatic capacitance, so that the electrostatic touch panel 110 can specify the respective sets of coordinates when a plurality of positions are touched (multi-touched) at the same time. A resistive touch panel, which will be described later, is provided on the rear surface side of the electrostatic touch panel 110. The resistive touch panel detects a pressure generated by touch to specify the touch coordinates.

The operation key 120 is a physical key capable of being pressed and receives an operation input if a user presses it. That is to say, the operation key 120 includes a physical key for switching ON and OFF of a power supply of the mobile terminal device 100, for example. When the user presses the operation key 120, the operation key 120 causes the mobile terminal device 100 to execute various functions.

Figure 2:
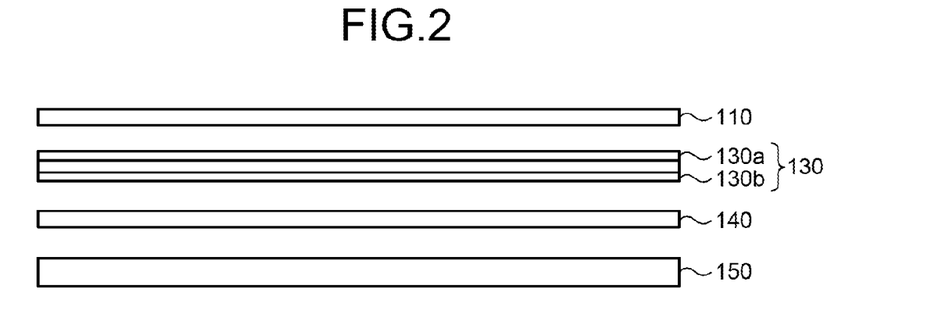
FIG. 2 is a schematic view illustrating a configuration of the periphery of a touch panel according to the embodiment.

FIG. 2 is a schematic view illustrating a configuration of the periphery of the touch panel including the electrostatic touch panel 110. Although adjacent constituent components are illustrated with spaces therebetween in order to distinguish the respective constituent components in FIG. 2, the respective constituent components may be made contact with each other or may be bonded with a double-stick tape (not illustrated), for example.

As illustrated in FIG. 2, a resistive touch panel 130 is provided on the rear surface side of the electrostatic touch panel 110. The resistive touch panel 130 has a structure in which two resistance films 130a and 130b are opposed to each other with a space interposed therebetween. If the electrostatic touch panel 110 is touched, the resistance film 130a closer to electrostatic touch panel 110 is deformed with the pressure of the touch and makes contact with the resistance film 130b. With this, the electric current flows in between the resistance films 130a and 130b and a resistance can be obtained. The resistance changes depending on the positions at which the resistance films 130a and 130b make contact with each other, so that the touch coordinates are specified from the obtained resistance. Even when a plurality of positions are touched (multi-touched) at the same time, the resistance to be obtained is one value. In this case, one set of touch coordinates in the vicinity of the multi-touched region is specified.

In the following description, touch that a pressure with which the resistance films 130a and 130b make contact with each other is applied to the electrostatic touch panel 110 is expressed as "strong touch" in some cases. In the same manner, touch that a pressure with which the resistance films 130a and 130b do not make contact with each other is applied to the electrostatic touch panel 110 is expressed as "soft touch" in some cases.

The electrostatic touch panel 110 and the resistive touch panel 130 are fixed to a supporting plate 140 made of a transparent material such as acryl and glass and arranged so as to be superimposed together with the supporting plate 140 on a display unit 150. The display screen of the display unit 150 can be viewed through the electrostatic touch panel 110, the resistive touch panel 130, and the supporting plate 140. As a result, a user touches the electrostatic touch panel 110 so as to operate instinctively as if the user touches the display screen directly.

Figure 3:
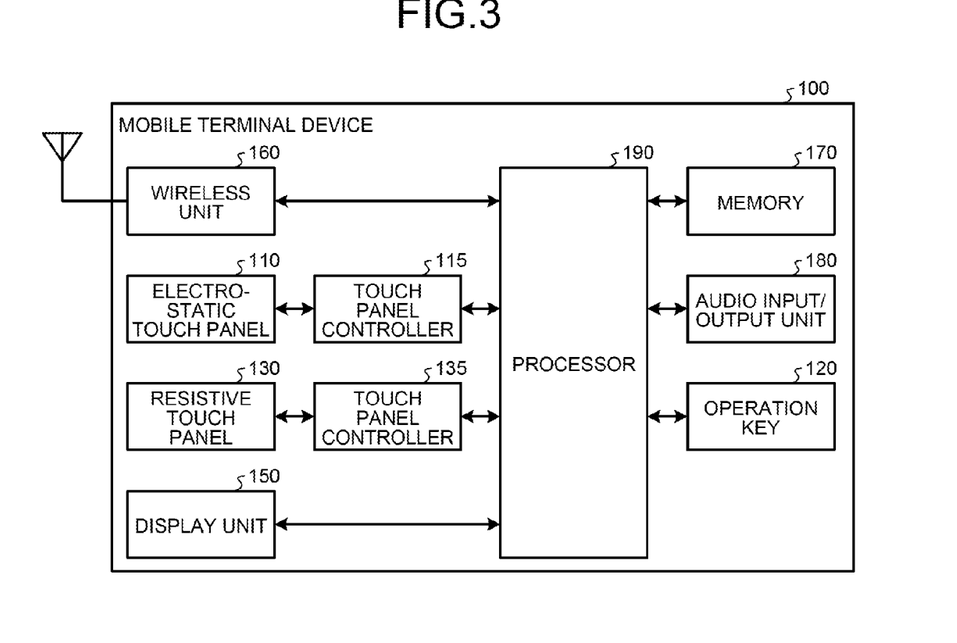
FIG. 3 is a block diagram illustrating a configuration of the mobile terminal device according to the embodiment.

FIG. 3 is a block diagram illustrating the configuration of the mobile terminal device 100 according to one embodiment. The mobile terminal device 100 as illustrated in FIG. 3 includes the electrostatic touch panel 110, a touch panel controller 115, the operation key 120, the resistive touch panel 130, a touch panel controller 135, the display unit 150, a wireless unit 160, a memory 170, an audio input/output unit 180 and a processor 190.

As described above, the electrostatic touch panel 110 detects a change in the electrostatic capacitance by touch and specifies a touched position. That is to say, the electrostatic touch panel 110 detects a change in the electrostatic capacitance at one place or a plurality of places. Then, the touch panel controller 115 acquires the coordinates of the position at which electrostatic capacitance has been changed on the electrostatic touch panel 110 and outputs the acquired coordinates to the processor 190. In other words, the touch panel controller 115 acquires the touch coordinates on the electrostatic touch panel 110 and outputs it to the processor 190. Furthermore, the touch panel controller 115 calculates a detection area of a region on which the change in the electrostatic capacitance has been detected on the electrostatic touch panel 110 and outputs it to the processor 190. In this case, the touch panel controller 115 outputs the detection area to the processor 190 in such a manner that the detection area is made to correspond to each set of touch coordinates.

The operation key 120 receives an operation input so as to be complementary with the electrostatic touch panel 110 and the resistive touch panel 130. To be more specific, the operation key 120 includes the above-mentioned physical key for switching ON and OFF of the power supply and a physical key for switching light-up and light-out of the display unit 150.

The resistive touch panel 130 detects a pressure generated by touch and specifies the touched position. That is to say, the resistive touch panel 130 detects that the resistance films 130a and 130b as illustrated in FIG. 2 make contact with each other with the pressure generated by touch. Furthermore, the touch panel controller 135 acquires the coordinates corresponding to the position at which the resistance films 130a and 130b make contact with each other on the resistive touch panel 130 and outputs the acquired coordinates to the processor 190. In other words, the touch panel controller 135 acquires the touch coordinates on the resistive touch panel 130 and outputs it to the processor 190. The touch panel controller 135 acquires one set of coordinates even when multi touch has been made. This indicates that the acquired coordinates are not necessarily identical to the actually touched coordinates.

The display unit 150 includes a liquid crystal module arranged so as to be superimposed with the electrostatic touch panel 110 and the resistive touch panel 130 and displays display screen information to be output from the processor 190. That is to say, if the processor 190 executes an application program and the display screen information having a content corresponding to the execution result is generated, the display unit 150 displays the generated display screen information. When the display is changed with the application processing, for example, the display unit 150 switches the screen in accordance with the application processing.

The wireless unit 160 receives a signal through an antenna and outputs the received signal to the processor 190. Furthermore, the wireless unit 160 transmits a signal generated by the processor 190 through the antenna. When the mobile terminal device 100 is a mobile phone capable of making a phone call, for example, the wireless unit 160 transmits and receives signals of speaking audio of the user and received audio.

The memory 170 includes a read only memory (ROM) or a random access memory (RAM), for example, and is a storage unit that stores programs and data to be executed by the processor 190.

The audio input/output unit 180 includes an audio input device such as a microphone and an audio output device such as a speaker. When the mobile terminal device 100 is the mobile phone capable of making a phone call, for example, the audio input/output unit 180 receives input of the speaking audio of the user and outputs the received audio.

The processor 190 acquires the touch coordinates and the detection area to be output from the touch panel controllers 115 and 135 and determines a touch mode indicating a touched manner based on the touch coordinates and the detection area. Then, the processor 190 determines the coordinates to be employed as the actually touched coordinates from the touch coordinates output from the touch panel controllers 115 and 135 in accordance with the determined touch mode. That is to say, the processor 190 sets use coordinates to be used for the application processing from the touch coordinates on the electrostatic touch panel 110 and the resistive touch panel 130.

Furthermore, the processor 190 fixes the coordinates of the final touch position from the use coordinates if needed. That is to say, the processor 190 fixes the coordinates of the touch position at which a user has pressed strongly among the touch positions at a plurality of places, for example, and corrects the touch position by using the use coordinates.

Then, described are the touch modes to be determined by the processor 190 and the use coordinates in the respective touch modes with reference to FIG. 4 and FIGS. 5A to 5F.

Figure 4:
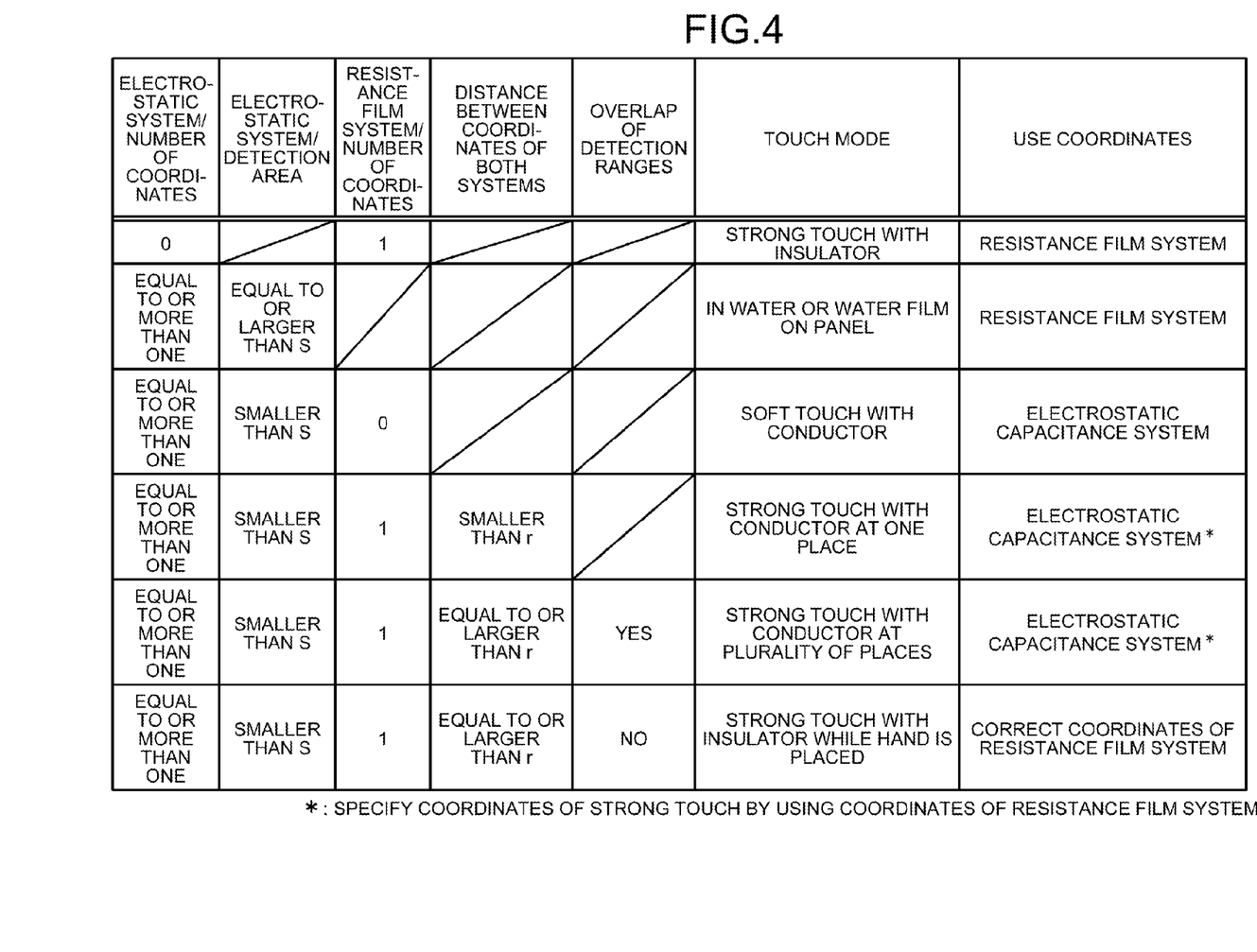
FIG. 4 is a table illustrating touch modes and use coordinates in accordance with touch detection states.

FIG. 4 is a table illustrating a list of the touch modes and the use coordinates in accordance with the touch detection states. As illustrated in FIG. 4, the processor 190 determines a touch mode from among six touch modes based on the touch coordinates and the detection area(s) to be output from the touch panel controllers 115 and 135 and sets the use coordinates in accordance with each touch mode.

Figure 5A:
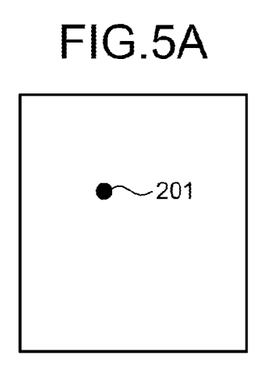
FIGS. 5A to 5F are views each illustrating a specific example of the touch detection state.

To be more specific, firstly, when the touch coordinates have not been detected on the electrostatic touch panel 110 and the touch coordinates have been detected on the resistive touch panel 130, the processor 190 determines that strong touch with the insulator has been made. That is to say, as illustrated in FIG. 5A, for example, when touch has been detected at a point 201 on the resistive touch panel 130 only, the processor 190 determines that the resistive touch panel 130 has been pressed not by the touch with the conductor but by the touch with the insulator. Then, the processor 190 sets the use coordinates in this case to the touch coordinates on the resistive touch panel 130.

Figure 5B:
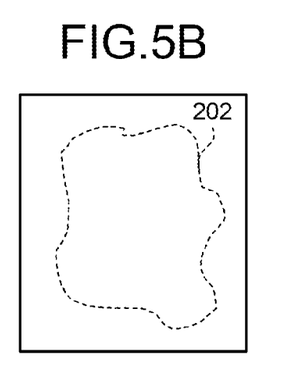

Secondly, when the touch coordinates have been detected on the electrostatic touch panel 110 and the corresponding detection area is equal to or higher than a predetermined value S, the processor 190 determines that the mobile terminal device 100 is in water or a water film is present on the electrostatic touch panel 110. That is to say, as illustrated in FIG. 5B, for example, when touch has been detected on a region 202 on the electrostatic touch panel 110, it is considered that touch with the conductor has been made on a relatively large area. Based on this, the processor 190 determines that water adheres to the electrostatic touch panel 110. In this case, touch with a finger or the like is incapable of being detected accurately on the electrostatic touch panel 110, so that the processor 190 sets the use coordinates to the touch coordinates on the resistive touch panel 130.

Although it is determined that water adheres to the electrostatic touch panel 110 when the detection area on the electrostatic touch panel 110 is equal to or larger than the predetermined value S, the adhesion material is not limited to water. Alternatively, it may be determined that conductive liquid adheres to the electrostatic touch panel 110. It may be determined that a conductive solid such as a metal makes contact with the overall surface of the electrostatic touch panel 110. Note that when the solid makes contact with the overall surface of the electrostatic touch panel 110, the electrostatic touch panel 110 is not touched with a finger or the like normally.

In the above-mentioned two touch detection states, the touch coordinates are not detected on the electrostatic touch panel 110 or the detection area on the electrostatic touch panel 110 is equal to or larger than the predetermined value S. On the other hand, in the following four touch detection states, touch detection states on the electrostatic touch panel 110 are common, equal to or more than one set of touch coordinates are detected on the electrostatic touch panel 110, and the detection area corresponding to each set of touch coordinates is smaller than the predetermined value S. In the following, description relating to the touch detection states on the electrostatic touch panel 110 is omitted in some cases.

Figure 5C:
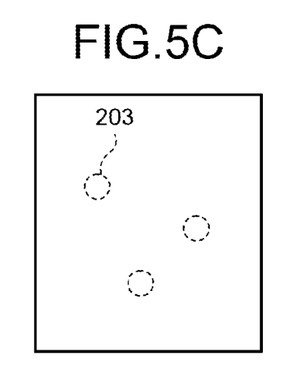

Thirdly, when the touch coordinates have been detected on the electrostatic touch panel 110 and the touch coordinates have not been detected on the resistive touch panel 130, the processor 190 determines that the soft touch with the conductor has been made. That is to say, for example, as illustrated in FIG. 5C, when touch on a region 203 and the like has been detected on the electrostatic touch panel 110 only, the processor 190 determines that the soft touch with which the resistance films 130a and 130b do not make contact with each other has been made on these regions. Then, the processor 190 sets the use coordinates in this case to the touch coordinates on the electrostatic touch panel 110.

Figure 5D:
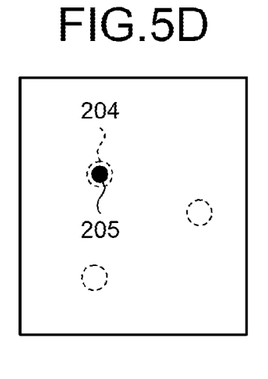

Fourthly, when the touch coordinates have been detected on both the electrostatic touch panel 110 and the resistive touch panel 130 and a distance between the touch coordinates detected on the touch panels of both systems is smaller than a predetermined value r, the processor 190 determines that strong touch with the conductor has been made at one place. That is to say, for example, as illustrated in FIG. 5D, when touch on a region 204 has been detected on the electrostatic touch panel 110 and touch on a point 205 has been detected on the resistive touch panel 130, a distance between these touch coordinates is smaller than the predetermined value r. Based on this fact, because the touch coordinates detected by the touch panels of both systems are substantially identical to each other, it is considered that the strong touch with the conductor has been made at the position of the region 204 and the point 205. Then, the processor 190 determines that the strong touch with the conductor has been made at the position of the region 204 and the point 205. When other touch coordinates have been also detected on the electrostatic touch panel 110, the processor 190 determines that the soft touch with the conductor has been made at the touch coordinates.

In this fourth case, the processor 190 sets the use coordinates to the touch coordinates on the electrostatic touch panel 110 and further specifies the touch coordinates at which the strong touch has been made by using the touch coordinates on the resistive touch panel 130. To be more specific, for example, in the case as illustrated in FIG. 5D, the processor 190 determines that the strong touch has been made on the region 204 substantially identical to the point 205 detected on the resistive touch panel 130. The processor 190 determines that the soft touch has been made on regions other than the region 204 that have been detected on the electrostatic touch panel 110.

Figure 5E:
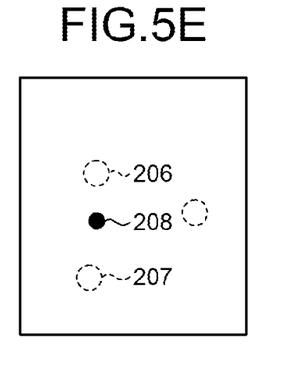

Fifthly, when the touch coordinates have been detected on both the electrostatic touch panel 110 and the resistive touch panel 130 and a distance between the touch coordinates detected on the touch panels of both systems is equal to or larger than the predetermined value r, the processor 190 compares the ranges in which the touch coordinates have been detected. Then, the processor 190 determines whether the touch coordinates detected on the resistive touch panel 130 is overlapped with a range encompassing all the touch coordinates detected on the electrostatic touch panel 110. As a result of this, when the ranges in which the touch coordinates have been detected are overlapped, the processor 190 determines that the strong touch with the conductor has been made at a plurality of places. That is to say, as illustrated in FIG. 5E, for example, when a point 208 detected on the resistive touch panel 130 is included in a range encompassing all regions 206 and 207 detected on the electrostatic touch panel 110, the processor 190 determines that the strong touch has been made at a plurality of places. As a reason for this, in FIG. 5E, it is considered that an intermediate point 208 between the regions 206 and 207 has been detected on the resistive touch panel 130 because the regions 206 and 207 have been touched strongly with the conductor.

In the fifth case, the processor 190 sets the use coordinates to the touch coordinates on the electrostatic touch panel 110, and further specifies touch coordinates at which the strong touch has been made by using the touch coordinates on the resistive touch panel 130. To be more specific, for example, in the case as illustrated in FIG. 5E, the processor 190 determines that the strong touch has been made on the regions 206 and 207 of which intermediate position corresponds to the point 208 detected on the resistive touch panel 130. The processor 190 determines that the soft touch has been made on the regions other than the regions 206 and 207 that have been detected on the electrostatic touch panel 110. It is to be noted that the specification of the touch coordinates at which the strong touch has been made in the fifth case will be described in detail later.

Figure 5F:
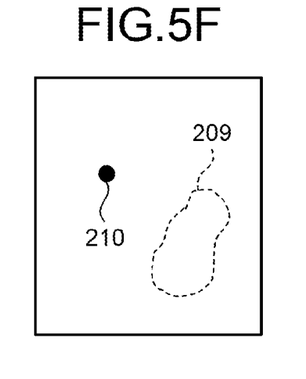

Sixthly, the processor 190 determines whether the touch coordinates detected on the resistive touch panel 130 is overlapped with the range encompassing all the touch coordinates detected on the electrostatic touch panel 110 as in the above-mentioned fifth case. As a result, when the ranges in which the touch coordinates have been detected are not overlapped unlike the above-mentioned fifth case, the processor 190 determines that the strong touch with the insulator has been made in the state where a user's hand is placed on the touch panel. That is to say, for example, as illustrated in FIG. 5F, when a point 210 detected on the resistive touch panel 130 is not included in the range encompassing a region 209 detected on the electrostatic touch panel 110, the processor 190 determines that the strong touch has been made in the state where the user's hand is placed. As a reason for this, in FIG. 5F, it is considered that the region 209 corresponding to the user's hand on the electrostatic touch panel 110 has been detected and the point 210 has been detected on the resistive touch panel 130 as a result of the strong touch with the insulator such as a pen held by the user's hand.

In the sixth case, the processor 190 sets the use coordinates to the touch coordinates on both the electrostatic touch panel 110 and the resistive touch panel 130 and fixes the coordinates of the final touch positions from the use coordinates. That is to say, the processor 190 corrects the touch coordinates on the resistive touch panel 130 by using the touch coordinates and the detection areas on the electrostatic touch panel 110 so as to obtain the final touch positions. This indicates that both the region 209 and the point 210 in FIG. 5F are not used as the final touch positions as they are. It is to be noted that calculation of the final touch positions in the sixth case will be described in detail later.

Figure 6:
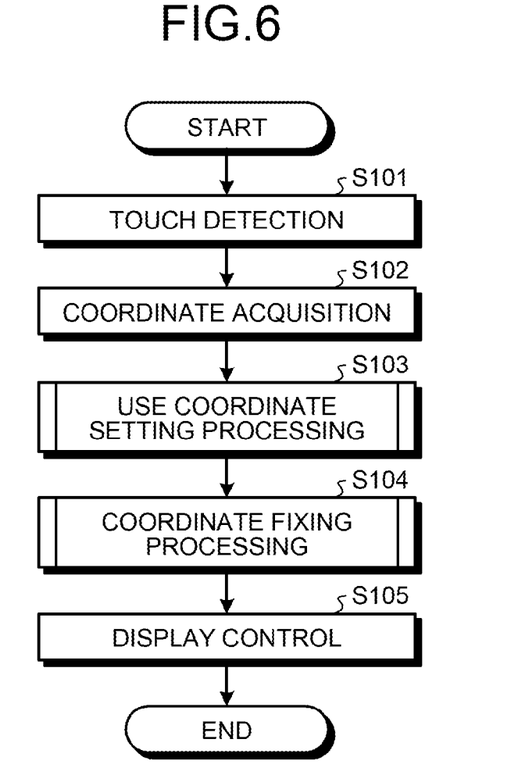
FIG. 6 is a flowchart illustrating operations of the mobile terminal device according to the embodiment.

Next, described are operations of the mobile terminal device 100 configured as described above with reference to the flowchart as illustrated in FIG. 6.

While the mobile terminal device 100 is being operated, the touch panel controller 115 and the touch panel controller 135 monitor the electrostatic touch panel 110 and the resistive touch panel 130, respectively, so as to detect touch on the touch panels (step S101). To be more specific, the touch panel controller 115 detects a change in the electrostatic capacitance on the electrostatic touch panel 110 so as to detect touch with a conductor. The touch panel controller 135 detects contact between the resistance films 130a and 130b included by the resistive touch panel 130 so as to detect strong touch.

Then, if at least any one of the touch panel controllers detects the touch, the touch panel controller that has detected the touch acquires touch coordinates (step S102). To be more specific, the touch panel controller 115 acquires coordinates (touch coordinates) of a region on which the electrostatic capacitance has been changed on the electrostatic touch panel 110 and an area of the region (detection area). With this, the touch panel controller 115 acquires the touch coordinates and the detection area of the position at which touch with the conductor has been made. On the other hand, the touch panel controller 135 obtains a resistance from an electric current that flows if the resistance films 130a and 130b included by the resistive touch panel 130 make contact with each other. Then, acquired is coordinates (touch coordinates) at the position pressurized such that the resistance films 130a and 130b make contact with each other based on the obtained resistance. With this, the touch panel controller 135 acquires the touch coordinates of the position at which the strong touch has been made.

The respective touch panel controllers output the acquired touch coordinates and the detection area to the processor 190. Then, the processor 190 executes processing of setting the use coordinates from the touch coordinates and the detection area (step S103). That is to say, set is which one of the touch coordinates detected on the electrostatic touch panel 110 and the resistive touch panel 130 is to be used for the application processing. The use coordinate setting processing will be described in detail later with reference to FIG. 7.

If the use coordinates have been set, the processor 190 fixes the coordinates of the final touch position from the use coordinates subsequently (step S104). That is to say, the strong touch and the soft touch are mixed or the touch coordinates do not indicate the actual touch position depending on the touch detection states in some cases. For solving this, the processor 190 determines the strong touch or the soft touch or corrects the touch coordinates. The coordinate fixing processing will be described in detail later with reference to FIG. 8.

If the coordinates of the final touch position have been fixed in this manner, the processor 190 executes processing in accordance with the touch position and controls display on the display unit 150, for example (step S105). To be more specific, for example, executed is processing when a button that is being displayed at the touch position has been pressed and the display screen on the display unit 150 is changed and so on. In the embodiment, even in the touch detection state where multi touch including the strong touch and the soft touch has been made, the processor 190 determines the touch mode accurately, so that complicated and advanced operations can be performed with the touch panel.

Figure 7:
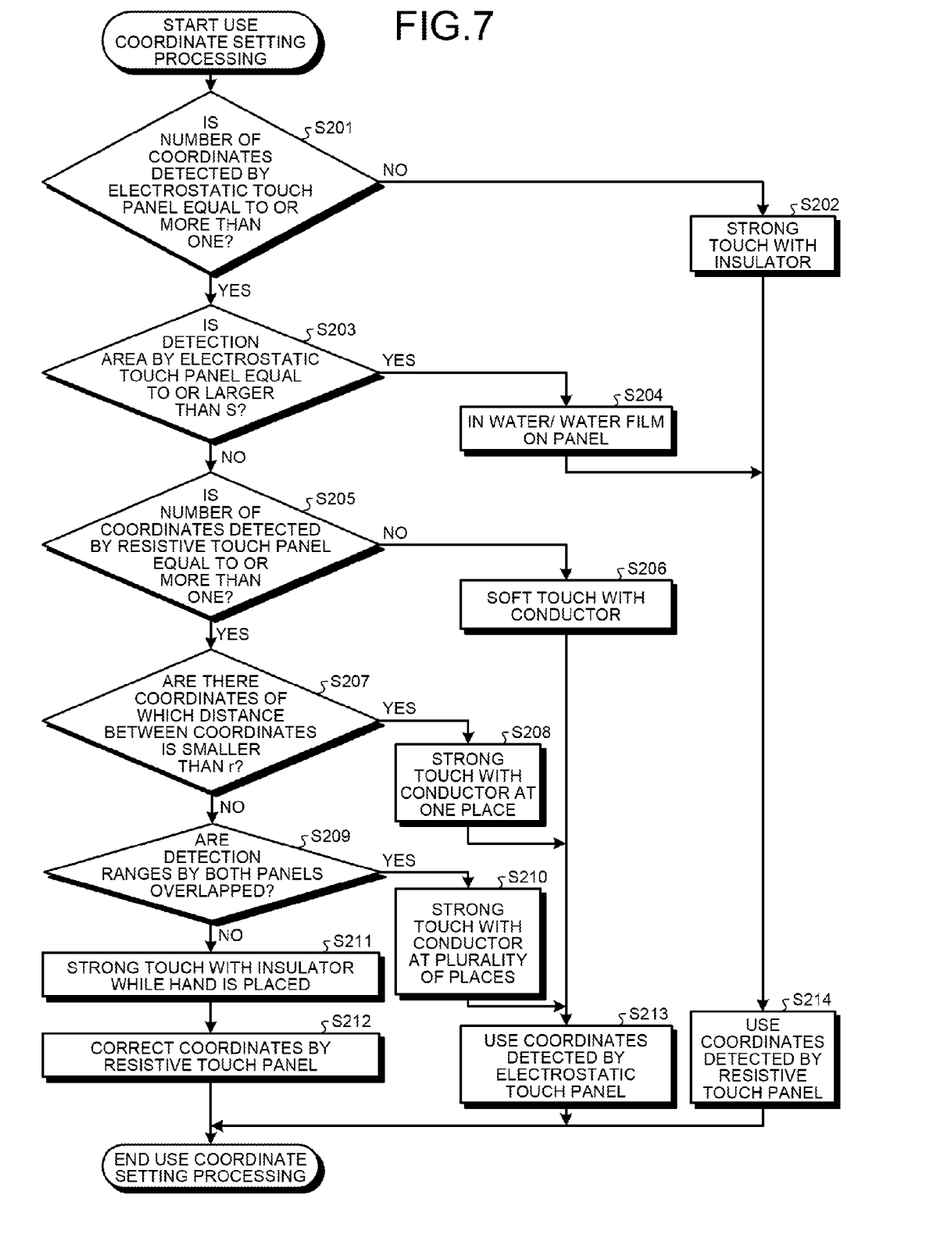
FIG. 7 is a flowchart illustrating use coordinate setting processing according to the embodiment.

Next, described is the use coordinate setting processing to be executed by the processor 190 with reference to the flowchart as illustrated in FIG. 7.

First, the processor 190 determines whether the number of touch coordinates detected by the electrostatic touch panel 110 is equal to or more than one (step S201). That is to say, the processor 190 determines whether the touch panel controller 115 has output the touch coordinates and the detection area.

As a result of the determination, when the electrostatic touch panel 110 has not detected the touch coordinates (No at step S201), it is considered that only the resistive touch panel 130 has detected the touch coordinates. Then, the processor 190 determines that the touch with the conductor has not been made but the strong touch with the insulator has been made (step S202). In this case, the processor 190 sets the use coordinates to the touch coordinates on the resistive touch panel 130 (step S214) and finishes the use coordinate setting processing.

As a result of the determination at step S201, when the electrostatic touch panel 110 has detected equal to or more than one set of touch coordinates (Yes at step S201), the processor 190 determines whether the detection area is equal to or larger than the predetermined value S (step S203). That is to say, the processor 190 determines whether an area of a region on which electrostatic capacitance has been changed on the electrostatic touch panel 110 is equal to or larger than the predetermined value S.

As a result of the determination, when the detection area is equal to or larger than the predetermined value S (Yes at step S203), it is considered that the surface of the electrostatic touch panel 110 makes contact with the conductor over a relatively large area. Then, the processor 190 determines that the mobile terminal device 100 is in water or a water film adheres to the surface of the electrostatic touch panel 110 (step S204). In this case, it is difficult to detect touch with the conductor such as a finger on the electrostatic touch panel 110, so that the processor 190 sets the use coordinates to the touch coordinates on the resistive touch panel 130 (step S214) and finishes the use coordinate setting processing.

As a result of the determination at step S203, when the detection area is smaller than the predetermined value S (No at step S203), the processor 190 determines whether the number of touch coordinates detected by the resistive touch panel 130 is equal to or more than one (step S205). That is to say, the processor 190 determines whether the touch panel controller 135 has output a touch coordinate.

As a result of the determination, when the resistive touch panel 130 has not detected the touch coordinate (No at step S205), it is considered that only the electrostatic touch panel 110 has detected the touch coordinates. Then, the processor 190 determines that the strong touch with which the resistance films 130a and 130b make contact with each other has not been made but the soft touch with the conductor has been made (step S206). In this case, the processor 190 sets the use coordinates to the touch coordinates on the electrostatic touch panel 110 (step S213) and finishes the use coordinate setting processing.

As a result of the determination at step S205, when the resistive touch panel 130 has detected equal to or more than one touch coordinate (Yes at step S205), the processor 190 compares the distance between the touch coordinates on both touch panels with the predetermined value r. Then, the processor 190 determines whether there is a combination in which the distance between the coordinates is smaller than the predetermined value r among the combinations of the touch coordinates on both touch panels (step S207). That is to say, the processor 190 determines whether substantially the same touch coordinates have been detected on the electrostatic touch panel 110 and the resistive touch panel 130.

As a result of the determination, when there is the combination in which the distance between the coordinates is smaller than the predetermined value r (Yes at step S207), it is considered that the strong touch has been made only at the position corresponding to the combination of the touch coordinates. In other words, if one place has been touched strongly with the conductor such as a finger, the electrostatic capacitance of the electrostatic touch panel 110 is changed and the resistance films 130a and 130b of the resistive touch panel 130 make contact with each other at one place. Then, even when multi touch has been detected by the electrostatic touch panel 110, it is considered that the soft touch has been made at the touch coordinates that are not identical to the touch coordinates on the resistive touch panel 130. When the distance between the touch coordinates on two touch panels is smaller than the predetermined value r, the processor 190 determines that the strong touch with the conductor has been made at one place (step S208). In this case, the processor 190 sets the use coordinates to the touch coordinates on the electrostatic touch panel 110 (step S213) and finishes the use coordinate setting processing. Note that as will be described later, the processor 190 specifies the touch coordinates at which the strong touch has been made based on the touch coordinates on the resistive touch panel 130 and fixes the final touch position.

As a result of the determination at step S207, when there is no combination in which the distance between the touch coordinates is smaller than the predetermined value r (No at step S207), the processor 190 determines whether the detection ranges of the touch coordinates on both touch panels are overlapped (step S209). That is to say, the processor 190 determines whether the range encompassing all the touch coordinates by the electrostatic touch panel 110 includes the touch coordinate by the resistive touch panel 130.

As a result of the determination, when the detection ranges of the touch coordinates on both touch panels are overlapped (Yes at step S209), it is considered that the intermediate position of a plurality of positions has been detected as a touch coordinate on the resistive touch panel 130 as a result of the strong touch at the positions. In other words, if a plurality of places have been touched strongly with the conductor such as a finger, for example, a plurality of touch coordinates corresponding to the places are detected on the electrostatic touch panel 110. On the other hand, one point at the intermediate position of the places that have been touched strongly is detected as the touch coordinate on the resistive touch panel 130. When the detection ranges of the touch coordinates on both touch panels are overlapped, the processor 190 determines that the strong touch with the conductor has been made at a plurality of places (step S210). In this case, the processor 190 sets the use coordinates to the touch coordinates on the electrostatic touch panel 110 (step S213), and finishes the use coordinate setting processing. Note that as will be described later, the processor 190 specifies the touch coordinate at which the strong touch has been made based on the touch coordinate on the resistive touch panel 130 and fixes the final touch positions.

As a result of the determination at step S209, when the detection ranges of the touch coordinates on both touch panels are not overlapped (No at step S209), the processor 190 determines that the strong touch with the insulator has been made in the state where a user's hand is placed on the touch panel (step S211). That is to say, the processor 190 determines that the user's hand holding a pen or the like as the insulator is placed on the electrostatic touch panel 110 and the strong touch with the pen or the like has been made.

The processor 190 makes the determination in the above-mentioned manner for the following reason. That is to say, it is considered that the electrostatic touch panel 110 detects the touch coordinates at the position at which the user's hand as the conductor is placed when a user touches the touch panel while holding the pen as the insulator with his/her hand. At the same time, it is considered that the resistive touch panel 130 detects the touch coordinate due to the pressure by the pen and the user's hand at the position distanced from the detection position of the touch coordinates by the electrostatic touch panel 110. When the detection ranges of the touch coordinates on both touch panels are not overlapped, the processor 190 determines that the strong touch with the insulator has been made in the state where the user's hand is placed on the touch panel. In this case, the processor 190 determines to correct the touch coordinate on the resistive touch panel 130 based on the touch coordinates and the detection area on the electrostatic touch panel 110 (step S212), and finishes the use coordinate setting processing.

In the embodiment, the touch modes are determined finely as described above and appropriate use coordinates are set in the respective cases. In the mobile terminal device 100 including the electrostatic touch panel 110 and the resistive touch panel 130, even when various touch detection states may occur, the touch modes can be determined accurately.

Figure 8:
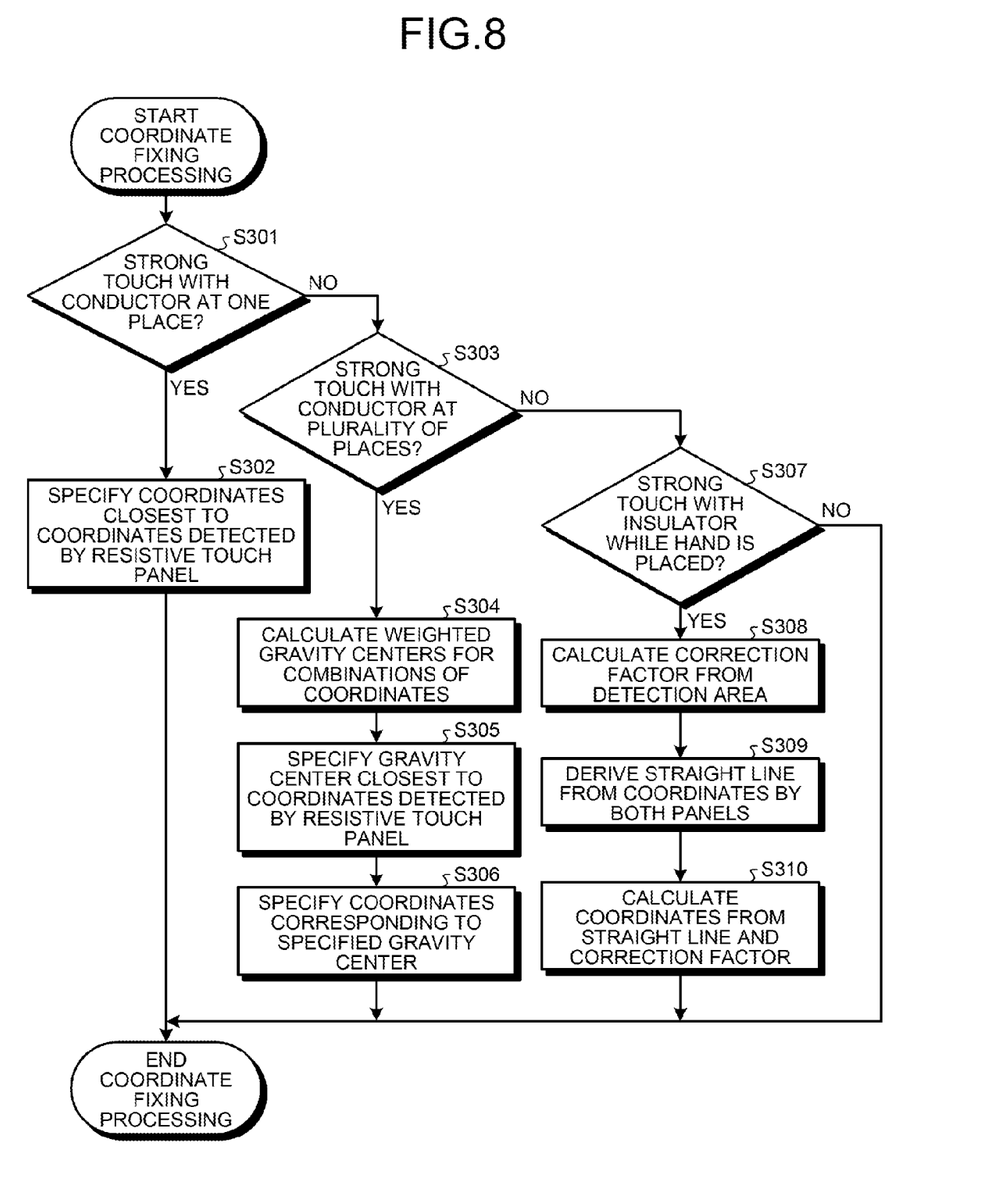
FIG. 8 is a flowchart illustrating coordinate fixing processing according to the embodiment.

Next, described is the coordinate fixing processing to be executed by the processor 190 with reference to the flowchart as illustrated in FIG. 8.

If the processor 190 has determined the touch mode and sets the use coordinates in accordance with the touch mode with the above-mentioned use coordinate setting processing, the processor 190 determines whether the touch mode is "strong touch with the conductor at one place" (step S301). Then, when the touch mode is the "strong touch with the conductor at one place" (Yes at step S301), the processor 190 specifies the touch coordinates closest to the touch coordinates on the resistive touch panel 130 among the touch coordinates on the electrostatic touch panel 110 (step S302). The touch coordinates specified in this manner indicate the touch coordinates of which distance to the touch coordinate on the resistive touch panel 130 is smaller than the predetermined value r. In this case, it is considered that the strong touch has been made at the touch coordinate. The processor 190, therefore, sets the use coordinates to the touch coordinates on the electrostatic touch panel 110, and fixes a fact that the strong touch has been made at one of the touch coordinates on the electrostatic touch panel 110 and the soft touch has been made at other touch coordinates.

When the touch mode is not the "strong touch with the conductor at one place" (No at step S301), the processor 190 determines whether the touch mode is "strong touch with the conductor at a plurality of places" (step S303). Then, when the touch mode is the "strong touch with the conductor at a plurality of palaces" (Yes at step S303), the processor 190 calculates weighted gravity centers from the touch coordinates on the electrostatic touch panel 110 (step S304).

The weighted gravity center is a gravity center obtained by weighing the respective touch coordinates with the corresponding detection areas. To be more specific, for example, when a detection area corresponding to touch coordinates $(x_a, y_a)$ is a and a detection area corresponding to touch coordinates $(x_b, y_b)$ is b, the weighted gravity center $(X_{ab}, Y_{ab})$ of the combination of these touch coordinates is calculated by the following equations:

$$X_{ab}=(a \times x_a + b \times x_b)/(a+b)$$

$$Y_{ab}=(a \times y_a + b \times y_b)/(a+b)$$

A weighted gravity center $(X_{abc}, Y_{abc})$ of three sets of touch coordinates including touch coordinates $(x_c, y_c)$ corresponding to a detection area c in addition to the above-mentioned two sets of touch coordinates is calculated by the following equations:

$$X_{abc}=(a \times x_a + b \times x_b + c \times x_c)/(a+b+c)$$

$$Y_{abc}=(a \times y_a + b \times y_b + c \times y_c)/(a+b+c)$$

In the same manner, the weighted gravity center can be obtained from the touch coordinates and the detection areas as for the combination of equal to or more than four touch coordinates.

The processor 190 calculates the weighted gravity centers for all the combinations of the touch coordinates on the electrostatic touch panel 110. Then, the processor 190 specifies the weighted gravity center closest to the touch coordinates on the resistive touch panel 130 among the calculated weighted gravity centers (step S305). When the touch mode is the "strong touch with the conductor at a plurality of places", it is considered that the touch coordinates have been detected on the resistive touch panel 130 in the vicinity of the weighted gravity center of the touch coordinates at which the strong touch has been made as a result of the strong touch at the places.

Then, the processor 190 specifies the combination of the touch coordinates corresponding to the weighted gravity center closest to the touch coordinates by the resistive touch panel 130 (step S306). That is to say, for example, when the above-mentioned weighted gravity center $(X_{ab}, Y_{ab})$ is closest to the touch coordinates by the resistive touch panel 130, the processor 190 specifies the combination of the touch coordinates $(x_a, y_a)$ and the touch coordinates $(x_b, y_b)$. The touch coordinates of the specified combination can be considered to be the touch coordinates at which the strong touch has been made among the sets of touch coordinates detected by the electrostatic touch panel 110. The processor 190 sets the use coordinates to the touch coordinates on the electrostatic touch panel 110 and fixes a fact that the strong touch has been made at the touch coordinates of the combination specified as described above and the soft touch has been made at other touch coordinates.

It is to be noted that the above-mentioned coordinate fixing processing by using the weighted gravity center is an example of processing for specifying the touch coordinates at which the strong touch has been made and the touch coordinates at which the strong touch has been made may be specified by another method. That is to say, for the combinations of the sets of touch coordinates by the electrostatic touch panel 110, for example, representative points that are different from the weighted gravity centers may be obtained from the touch coordinates of the respective combinations. In this case, the processor 190 may specify that the strong touch has been made at the touch coordinates of the combination of which representative point is closest to the touch coordinate on the resistive touch panel 130.

When the touch mode is not the "strong touch with the conductor at a plurality of places" (No at step S303), the processor 190 determines whether the touch mode is "strong touch with the insulator while a user's hand is placed" (step S307). When the touch mode is not the "strong touch with the insulator while a user's hand is placed" (No at step S307), the use coordinates that have been already set at the use coordinate setting processing corresponds to the final touch position, so that the processor 190 finishes the coordinate fixing processing.

On the other hand, when the touch mode is the "strong touch with the insulator while a user's hand is placed" (Yes at step S307), a correction factor a for correcting the touch coordinates by the resistive touch panel 130 is calculated based on the detection area on the electrostatic touch panel 110 (step S308). The larger the detection area is, the higher the correction factor a becomes, and the smaller the detection area is, the lower the correction factor a is.

As a reason of this, the detection area tends to be larger if the pressure applied by the user's hand placed on the touch panel is higher and the touch coordinates by the resistive touch panel 130 is closer to the position of the hand at the same time. That is to say, when the pressure applied by the hand is high, there is a possibility that the touch coordinates by the resistive touch panel 130 are the coordinates closer to the position of the user's hand largely relative to the position at which touch with the insulator has been made actually. Based on this, when the pressure applied by the hand is high, the touch coordinates by the resistive touch panel 130 is corrected largely by setting the correction factor a to be higher.

After the correction factor a has been calculated, the processor 190 derives a straight line connecting the touch coordinates on the electrostatic touch panel 110 and the resistive touch panel 130 (step S309). The position at which the touch with the insulator has been made actually is considered to be present on the straight line. Then, the processor 190 multiplies the distance d between the touch coordinates on the electrostatic touch panel 110 and the resistive touch panel 130 by the correction factor a, and calculates a coordinate on the straight line that is distanced from the touch coordinate on the resistive touch panel 130 by the obtained correction distance (a×d) (step S310).

Figure 9:
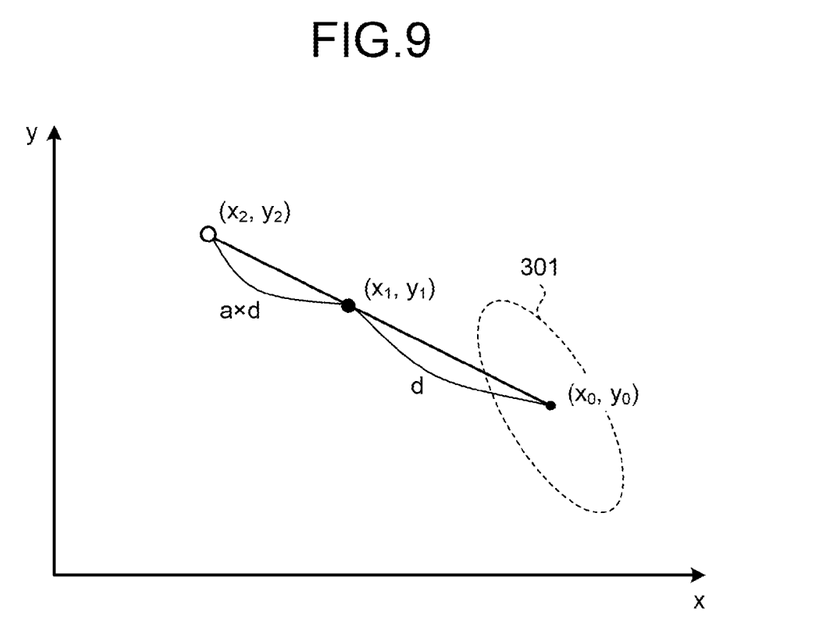
FIG. 9 is a graph illustrating a specific example of coordinate calculation.

FIG. 9 illustrates a specific example of the above-mentioned coordinate calculation. In FIG. 9, the electrostatic touch panel 110 detects a touch coordinate $(x_0, y_0)$ and the resistive touch panel 130 detects a touch coordinate $(x_1, y_1)$. The processor 190 calculates the correction factor a based on the detection area of a region 301 detected by the electrostatic touch panel 110. Then, the processor 190 derives a straight line connecting the touch coordinate $(x_0, y_0)$ and the touch coordinate $(x_1, y_1)$.

Furthermore, the processor 190 calculates a coordinate $(x_2, y_2)$ that is a coordinate on the derived straight line and distanced from the touch coordinate $(x_1, y_1)$ by the correction distance (a×d) obtained by multiplying the distance d between the touch coordinate $(x_0, y_0)$ and the touch coordinate $(x_1, y_1)$ by the correction factor a. The calculated coordinate $(x_2, y_2)$ is located at the opposite side to the touch coordinate $(x_0, y_0)$ with respect to the touch coordinate $(x_1, y_1)$. The processor 190 fixes the calculated coordinate $(x_2, y_2)$ to the coordinate of the position at which the touch with the insulator has been made actually.

It is to be noted that the above-mentioned coordinate fixing processing using the correction factor based on the detection area is an example of processing for specifying the position at which the touch with the insulator has been made actually. The position at which the touch with the insulator has been made actually may be specified with another method.

In this manner, in the embodiment, even when the strong touch and the soft touch are mixed or the touch coordinates do not indicate the actual touch position, the processor 190 fixes the final touch position based on the touch coordinates and the detection areas. This makes it possible to perform complicated and advanced operations by the touch panel. To be more specific, for example, when the multi touch has been detected, it is determined whether the touch at each set of touch coordinates is the strong touch or the soft touch. With this, an operation can be performed by changing the strength of touch with each finger while a plurality of fingers are kept being placed on the touch panel. As a result, keys equivalent to the keyboard of a personal computer are made to be displayed on the display unit 150 so as to enable a user to perform operations of what is called touch typing and the like.

As described above, according to the embodiment, the processor determines the touch mode and sets the use coordinates to be used for the application processing based on the touch coordinates and the detection areas detected by the electrostatic touch panel and the resistive touch panel. Furthermore, the processor fixes the strength of the touch and the coordinates of the actual touch position by using the use coordinates if needed. With this, various touch modes can be determined accurately depending on the situations, thereby further improving convenience of the mobile terminal device.

In the above-mentioned one embodiment, the strong touch with the conductor at a plurality of places and the strong touch with the insulator in the state where a user's hand is placed on the touch panel are determined based on whether detection ranges of the touch coordinates on two touch panels are overlapped. These two types of touch modes can be determined by another method. To be more specific, for example, when the detection area of the region detected by the electrostatic touch panel 110 is equal to or larger than a predetermined value S1, it may be determined that the user's hand is placed on the region. That is to say, at step S209 as illustrated in FIG. 7, the processor 190 may determine whether the detection area is equal to or larger than the predetermined value S1. Then, when the detection area is equal to or larger than the predetermined value S1, it is determined that the strong touch with the insulator has been made in the state where the user's hand is placed on the touch panel. In contrary, when the detection area is smaller than the predetermined value S1, it is determined that the strong touch with the conductor at a plurality of places has been made. It is to be noted that the predetermined value S1 is a value smaller than the predetermined value S to be used at step S203 as illustrated in FIG. 7.

The operations of the mobile terminal device 100 as described in the above-mentioned embodiment can be described as computer-executable programs. In this case, the programs can be stored in a computer-readable recording medium and be loaded on the computer. As the computer-readable recording medium, transportable recording media such as a compact disc read only memory (CD-ROM), a digital versatile disk (DVD), and a universal serial bus (USB) memory and semiconductor memories such as a flush memory can be exemplified.

One aspect of the information terminal device, the touch coordinate determination method, and the touch coordinate determination program as disclosed by the present application provides advantageous effects of accurately determining various touch modes depending on the situations and further improving convenience.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information terminal device comprising:
    a first touch panel that is configured to detect a touch coordinate with an electrostatic capacitance system;
    a second touch panel that is provided so as to be superimposed on the first touch panel and is configured to detect a touch coordinate with a resistance film system;
    a memory; and
    a processor connected to the memory, wherein the processor executes a process comprising:
        acquiring a plurality of touch coordinates detected on the first touch panel and the second touch panel;
        determining a touch mode including presence or absence of strong touch at equal to or higher than a predetermined pressure based on the acquired touch coordinates; and
        specifying a touch coordinate at which the strong touch is made when the touch mode with the strong touch is determined, wherein
    the specifying includes specifying that the strong touch is made at a combination of the touch coordinates, among a plurality of combinations of touch coordinates detected on the first touch panel, whose representative point obtained from the combination of the touch coordinates is closest to a touch coordinate detected on the second touch panel.

2. The information terminal device according to claim 1, wherein the determining includes:
    first determining whether a distance between a touch coordinate detected on the first touch panel and the touch coordinate detected on the second touch panel is equal to or larger than a predetermined value; and
    second determining whether the strong touch is made at only one place based on a result of the first determining.

3. The information terminal device according to claim 2, wherein the second determining includes determining that strong touch with a conductor is made at only one place when the distance between the touch coordinate detected on the first touch panel and the touch coordinate detected on the second touch panel is smaller than the predetermined value.

4. The information terminal device according to claim 3, wherein the specifying includes specifying that the strong touch is made at only the touch coordinate detected on the first touch panel and of which distance to the touch coordinate detected on the second touch panel is smaller than the predetermined value.

5. The information terminal device according to claim 1, wherein the determining includes:
    third determining whether the touch coordinate detected on the second touch panel is included in a detection range which encompasses all touch coordinates detected on the first touch panel; and
    fourth determining whether the strong touch is made at a plurality of places based on a result of the third determining.

6. The information terminal device according to claim 5, wherein the fourth determining includes determining that strong touch with a conductor is made at a plurality of places when the touch coordinate detected on the second touch panel is included in the detection range of the touch coordinates detected on the first touch panel.

7. The information terminal device according to claim 5, wherein the fourth determining includes determining that strong touch with an insulator is made in a state where a hand makes contact with the first touch panel when the touch coordinate detected on the second touch panel is not included in the detection range of the touch coordinates detected on the first touch panel.

8. The information terminal device according to claim 7, wherein the specifying includes:
    calculating a correction factor based on an area of a detection region corresponding to the touch coordinate detected on the first touch panel; and
    specifying that the strong touch is made at a coordinate obtained by correcting the touch coordinate detected on the second touch panel by using the correction factor.

9. A touch coordinate determination method comprising:
    acquiring a plurality of touch coordinates detected on a first touch panel that is configured to detect a touch coordinate with an electrostatic capacitance system and a second touch panel that is provided so as to be superimposed on the first touch panel and configured to detect a touch coordinate with a resistance film system;
    determining a touch mode including presence or absence of strong touch at equal to or higher than a predetermined pressure based on the acquired touch coordinates; and
    specifying a touch coordinate at which the strong touch is made when the touch mode with the strong touch is determined, wherein
    the specifying includes specifying that the strong touch is made at a combination of the touch coordinates, among a plurality of combinations of touch coordinates detected on the first touch panel, whose representative point obtained from the combination of the touch coordinates is closest to a touch coordinate detected on the second touch panel.

10. A non-transitory computer-readable recording medium having stored therein a touch coordinate determination program that causes a computer to execute a process comprising:
    acquiring a plurality of touch coordinates detected on a first touch panel that is configured to detect a touch coordinate with an electrostatic capacitance system and a second touch panel that is provided so as to be superimposed on the first touch panel and configured to detect a touch coordinate with a resistance film system;

determining a touch mode including presence or absence of strong touch at equal to or higher than a predetermined pressure based on the acquired touch coordinates; and specifying a touch coordinate at which the strong touch is made when the touch mode with the strong touch is determined, wherein the specifying includes specifying that the strong touch is made at a combination of the touch coordinates, among a plurality of combinations of touch coordinates detected on the first touch panel, whose representative point obtained from the combination of the touch coordinates is closest to a touch coordinate detected on the second touch panel.

* * * * *